United States Patent Office.

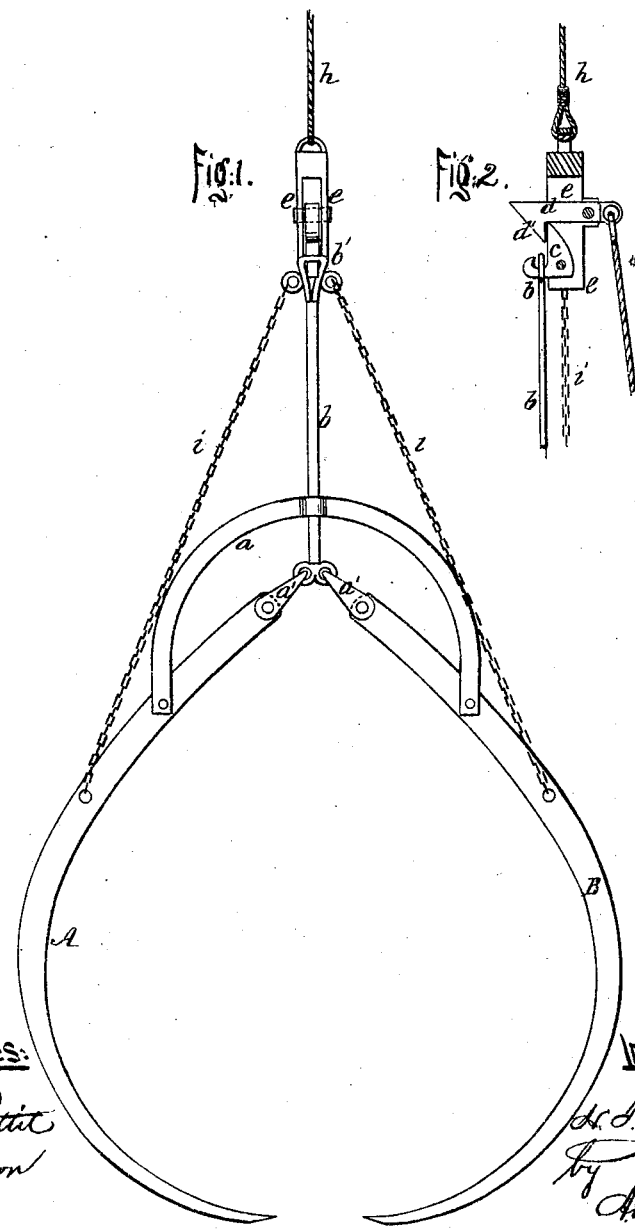

SAMUEL T. NIGH, OF LEITERSBURG, MARYLAND, ASSIGNOR TO HIMSELF, J. W. NIGH, AND UPTON BELL.

Letters Patent No. 89,683, dated May 4, 1869.

IMPROVEMENT IN HORSE HAY-FORKS.

The Schedule referred to in these Letters Patent and making part of the same.

To all whom it may concern:

Be it known that I, SAMUEL T. NIGH, of Leitersburg, in the county of Washington, and State of Maryland, have invented a new and improved Horse Hay-Fork; and I do hereby declare that the following is a full, clear, and exact description of the same, reference being had to the accompanying drawings, making a part of this specification, in which—

Figure 1 is a front elevation, and
Figure 2 is a side view.

This invention consists in combining with the two tines of a horse hay-fork a certain curved bar and a certain central key-rod, in such manner as that the tines may be locked when spread apart to their fullest extent, so as that one may serve as a handle for forcing the other into the hay.

Also, in combining said tines and central key-bars with a certain latch-device, for locking the tines together and unlocking the same.

Also, in combining said tines with the lifting-chains, in such a manner that when the said latch-device is unlocked the tines may separate of their own weight, whether they sustain a load or not.

In the drawings, A B represent two curved tines, of the kind ordinarily used in grapple horse hay-forks, said tines being pivoted in the ends of a curved bar, $a$.

The inner ends of the tines are connected by means of loops, $a'$ $a'$, with the lower end of a rod, $b$, which I call a key-rod, and which passes through a hole in the top of the curved bar $a$.

The inner ends of the tines A B approach so near each other, that when the bar $b$ is thrust down between them, the tines cannot be spread apart to their fullest extent without slightly springing back the ends of the curved bar $a$, which is made for the purpose, after which springing back the ends of the curved bar return to their original position, and lock the tines apart.

When thus secured, one tine may be used as a handle to force the other into the hay, and may then, by an exertion sufficient to overcome the resistance of the curved bar $a$, be unlocked and be itself thrust into the hay, point to point with the other tine.

Besides subserving the above-described purpose, the rod $b$, having a loop, $b'$, in its upper end, may thereby be connected with the latch-device which is used for locking the tines together.

Said latch-device consists of a curved lever, $c$, and a toothed lever, $d$, with a prong, $d'$, both pivoted between two metallic plates, $e$ $e$, which are united at their upper ends, where is the point of attachment for the lifting-chain $h$, the whole forming a clevis.

When the prong $d'$ is shut down over the upper end of the curved lever $c$, the lower end of said lever projects straight out from the clevis, and affords a prong, which is to be passed into the loop $b'$.

The clevis is united with the tines A B by chains $i$ $i$.

The parts of the apparatus being thus adjusted, force is applied to the lifting-chain, which is communicated, through the clevis-lever $c$ and connecting-rod $b$, to the tines, elevating them with their load. The downward pressure of the load upon the lever $c$ is sustained by the prong $d'$.

When the load has been conveyed over the proper place, by elevating the prong $d'$ clear of the lever $c$, by means of a rope attached to the opposite end of the lever $d$, the weight of the load at once causes the lever $c$ to revolve upon its pivot, and the loop $b'$ to slip off from the lever $c$, when the tines immediately are spread apart, and the load falls.

It is now to be observed that the separation of the tines, as above set forth, is not due to the load, since the tines are so arranged as to separate automatically whenever allowed so to do. This result is due to the fact that, when the connecting-bar $b$ is loosed from the latch-device, the curved bar $a$, and the key-rod $b$ act by dead weight upon the inner ends of the tines, so that the parts of the apparatus between the points of attachment of the chains $i$ $i$, which are the points of suspension, outweigh the parts of the tines outside said points, and sink of their own accord. This I consider an important result, and one of the main features of my invention.

Having thus described my invention,
What I claim as new, and desire to secure by Letters Patent, is—

1. The curved bar $a$, central key-rod $b$, and suspended forks A B, so combined as to lock the forks apart, for the purpose described.

2. In combination with the curved bar $a$, central key-rod $b$, and suspended forks A B, the latch-devices $c$ $d$ $d'$ and chains $i$ $i$, when constructed and arranged in the manner and for the purpose specified.

SAMUEL T. NIGH.

Witnesses:
JOHN C. MIDDLEKAUFF,
DANIEL W. LOWMAN.